United States Patent [19]

Spicer

[11] Patent Number: 5,712,466
[45] Date of Patent: Jan. 27, 1998

[54] PERFECT STEAK DEVICE

[76] Inventor: James T. Spicer, 770 Shawan Rd., Morrow, Ohio 45065

[21] Appl. No.: 550,248

[22] Filed: Oct. 30, 1995

[51] Int. Cl.$^6$ .............................. H05B 3/68; A23L 37/10
[52] U.S. Cl. .............................. 219/450; 99/349
[58] Field of Search .................... 219/552, 553, 219/450; 99/342, 349, 376, 419, 351

[56] References Cited

U.S. PATENT DOCUMENTS

| | | |
|---|---|---|
| 1,344,915 | 6/1920 | Love . |
| 1,854,850 | 4/1932 | Linkenauger . |
| 1,915,962 | 6/1933 | Vaughn . |
| 2,040,676 | 5/1936 | Stevens et al. ........................ 99/349 |
| 2,522,175 | 9/1950 | Hill ........................................ 99/349 |
| 2,648,275 | 8/1953 | Thompson . |
| 3,736,859 | 6/1973 | Carlson . |
| 3,744,403 | 7/1973 | Castronuovo . |
| 3,931,620 | 1/1976 | Wellmand, Jr. et al. ............... 99/342 |
| 3,975,720 | 8/1976 | Chen et al. ........................... 99/342 |
| 4,217,817 | 8/1980 | Meamber ............................... 99/349 |
| 4,669,373 | 6/1987 | Weimer et al. ........................ 99/349 |
| 4,702,159 | 10/1987 | Polster ................................... 99/349 |
| 5,537,950 | 7/1996 | Ou-Yang ................................ 99/342 |

*Primary Examiner*—Tu B. Hoang
*Assistant Examiner*—Sam Paik
*Attorney, Agent, or Firm*—Frost & Jacobs

[57] ABSTRACT

A cooking device comprising a hot plate with a top surface; a heatable bottom cooking surface bearing a plurality of outwardly-projecting, spring-loaded, food piercing temperature probes of different lengths, configured for injecting into a piece of food such that the temperature of the food surrounding at least one probe may be determined, and wherein the spring-loaded configuration allows the probes to retract into the body of the cooking device when contacting a non-penetrable surface; means for indicating the temperature at the probes' ends; means for controlling the temperature of the bottom cooking surface; and a handle.

12 Claims, 4 Drawing Sheets

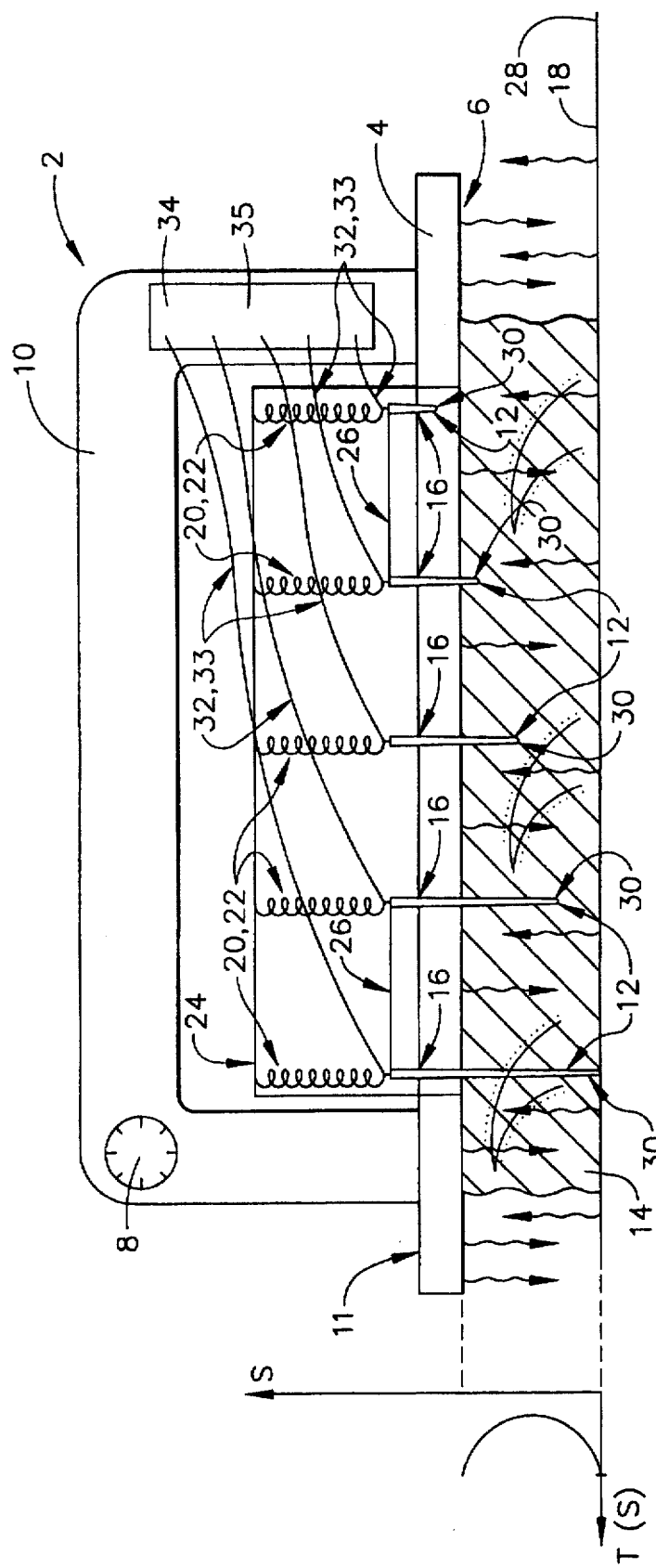

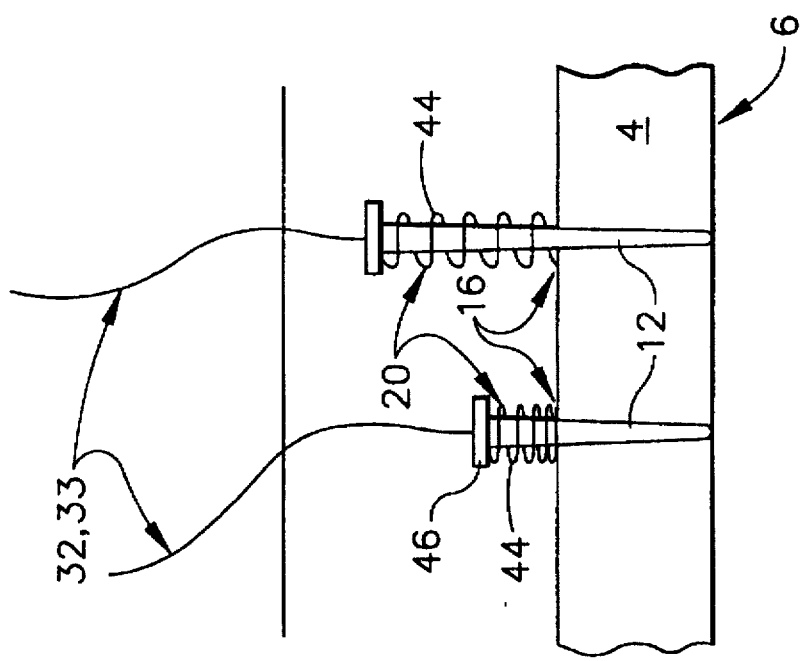
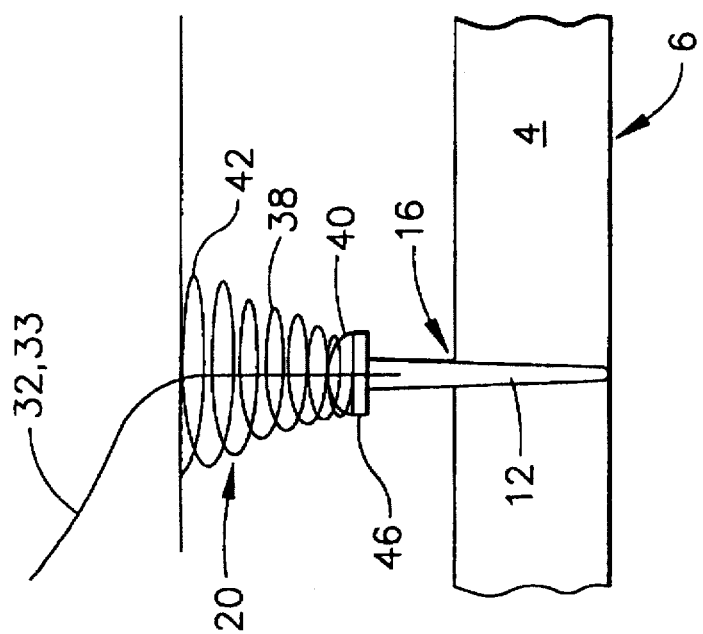

PERFECT STEAK DEVICE

TECHNICAL FIELD

The present invention relates generally to a food preparation device and is particularly directed to a cooking device which measures the interior temperature of the food being cooked. More specifically, the present invention allows the user to determine the degree of doneness of cooking meat or other food by simply reading the temperature of the coolest part of the meat or other food.

BACKGROUND OF THE INVENTION

In the past, it has been difficult to predict the extent to which food, particularly meat such as steak, is cooked. Generally, in the restaurant business, only the finest chefs with extensive training and experience are able to cook steaks to perfection. More often than not, however, restaurants have less educated, less experienced cooks cooking their steaks for economic and other reasons. Consequently, when restaurant patrons order their steaks rare, medium, or well-done, cooks often resort to guesswork to meet those requests, resulting in unsatisfied customers. Similarly, when lay people attempt to cook their own steaks at home, it is difficult to predict how well the meat has been cooked, resulting in many overcooked and undercooked steaks. Overcooked steaks taste poorly and are sometimes inedible; undercooked steaks can be dangerous due to the bacteria sometimes carried by the meat, such as salmonella in chicken, trichinae in pork and *E.coli* in beef. The present invention, by displaying the interior temperature of the coolest part of the meat, is particularly designed to allow any lay person to cook individual steaks to perfection, but may be used for other types of meat such as burgers, ham, chicken, sausage, or other foods, as well. For the sake of brevity, the invention will be described in conjunction with cooking steaks.

The preferred embodiment of the present invention is a hot plate having a top surface and a heatable bottom surface. The bottom surface heats the steak upon which it is placed. Projecting from the bottom surface are several spring-loaded temperature probes of different lengths which are injected into the steak, for measuring the temperature of the coolest part (usually the center) of the piece of meat. The spring-loading allows the probes to retract into the body of the hot plate when cooking thinner pieces of meat or meat with bones, thereby preventing breakage of the probes which might otherwise be caused by forcing them against a non-penetrable surface, such as a grill or meat bone. The top surface has a handle, means for controlling the temperature of the bottom surface heating element, and means for indicating the temperature of the probes' ends. Typically, the steak is placed on a grill and the present invention placed on top of it. As the steak cooks, the probes precisely measure the interior temperature of the steak, allowing it to be cooked to the desired "degree of doneness." Means, such as a display, for indicating the temperature of at least one probe's end, provides the user with the interior food temperature. In an alternative embodiment of the invention, the bottom surface of the present invention is not heatable, and there is no temperature controlling means. In that embodiment, the device does not cook both sides of the steak at the same time.

The advantages of this invention are its versatility which makes it applicable to most any cooking process, including grilling, frying, baking, broiling, etc.; its compactness which permits use with individual steaks or many steaks simultaneously; its adaptability to both thin and thick cuts of meat; its ability to ensure customer satisfaction with regard to cooking time (i.e., rare, medium, well-done scale); its ability to reduce cooking time; and its prevention of illness caused by bacteria sometimes found in undercooked meat.

Cooking devices incorporating the basic concept of a heating surface utilizing spikes, protrusions, projections or probes have long been desired for cooking steaks and other foods. Several embodiments of this basic idea have been proposed throughout the years, none of which have the precise combination of features which achieve the advantages of the present invention, i.e., a versatile cooking tool for determining the proper cooking time to ensure the desired doneness of a steak or other food.

U.S. Pat. No. 1,914,962, Vaughn, issued Jun. 27, 1933, discloses an electric cooker with upper and lower heating elements and several distributed probe-like heating elements which are injected into the item being cooked. The probe-like heating elements are capable of automatically receding upon contacting a non-penetrable portion of the item being cooked. This device envelopes the item being cooked and introduces heat to the external and middle portions simultaneously as a rapid cooking process. The configuration is similar to a waffle iron, having an upper portion which closes over the lower portion.

The Vaughn patent does not have a simple one-piece configuration which allows for cooking on most any medium, means for controlling the temperature of the hot plate, nor means for indicating the temperature of a probe's end. It also lacks the versatility, compactness, insurance of proper doneness on a rare to well-done scale, and illness-preventing qualities associated with the temperature-indicating feature of the present invention.

U.S. Pat. No. 3,236,859, Carlson, issued Jun. 5, 1973, shows another waffle-iron type of cooking device which includes opposed upper and lower heating plates, each plate having a surface with several outwardly extending food-piercing metal heating needles. The heating elements are controllable, and the controller has a temperature sensing probe which measures the temperature of the upper plate only.

Except for the ability to control and read the upper plate's temperature, Carlson possesses all of the above-mentioned drawbacks of the Vaughn device. Most significantly, the Carlson device does not determine nor indicate the temperature at the probes' ends (i.e., the temperature of the meat's interior). Furthermore, the Carlson device lacks the retractable feature of the present invention's temperature probes.

U.S. Pat. No. 1,344,914, Love, issued Jun. 29, 1920, describes a meat roaster with a turntable for holding and rotating meat which is placed into a heating apparatus, such as an oven. The turntable is provided with upstanding pointed projections on which the meat may be securely removably held. This device has probes that are injected into meat, but for stability purposes, rather than temperature-indicating purposes, and does not contain any of the above-identified inventive aspects of the present invention.

Other patents which have probe-like members which project into foods being cooked, but which do not disclose the inventive features of the present invention are: U.S. Pat. No. 3,744,403, Castronuovo, issued Jul. 10, 1973, which discloses an electrical appliance for toasting marshmallows; U.S. Pat. No. 2,648,275, Thompson, issued Aug. 11, 1953, which shows a sandwich bun toaster; and U.S. Pat. No. 1,854,850, Linkenauger, issued Apr. 19, 1932, which describes a roasting apparatus for heating pimentos.

None of the patents discussed discloses or suggests the precise combination of features embodied in the present invention. While all of the patents, discussed above, disclose protrusion-type members for projecting into foods, none of them describes a versatile, compact, one-piece configuration which removes the guesswork from the art of cooking perfectly done steaks, which is adaptable for substantially all steak thicknesses and which allows for cooking on almost any medium. Nor do they show means for indicating the temperature of the probes' ends, or the illness-preventing qualities associated with the temperature-indicating feature of the present invention.

There is a need in the art for a device particularly designed for cooking individual steaks to perfection, but which may also be used for any type of meat or other foods, that is applicable to most any cooking process, that is compact and permits application to individual steaks or to many steaks, that is adaptable to both thin and thick cuts of meat, that is able to ensure the consumer's satisfaction as to the degree of doneness of the steak, and that can provide an accurate measure of temperature, in order to minimize illness due to bacteria contamination of undercooked meat.

SUMMARY OF THE INVENTION

It is, therefore, an object of this invention to obviate the above-described problems in shortcomings of the prior art heretofore available.

It is the primary object of the present invention to provide a versatile cooking device which is capable of informing the user of when steaks are done to the desired degree.

It is a further object of the present invention to provide a cooking device which will ensure customer satisfaction with regard to a steak's cooking time and degree of doneness on a rare, medium, well-done scale.

It is still a further object of the present invention to provide a cooking device having several spring-loaded temperature probes capable of retracting up into the body of the cooking device when cooking thinner pieces of meat, thereby preventing breakage of the probes which might otherwise be caused by forcing them against a non-penetrable surface, such as a grill.

It is another object of the present invention to provide a cooking device comprised of a hot plate having a top surface and a heatable bottom surface, wherein the bottom surface heats the piece of food upon which it is placed.

It is yet another object of the present invention to provide a cooking device that is applicable to most any cooking process, including grilling, frying, baking, and broiling.

It is a further object of the present invention to provide a cooking device which may be used to cook completely and quickly any type of meat or other foods, as well.

It is even a further object of the present invention to provide a cooking device which may prevent illness due to bacteria contamination of improperly cooked meat.

Still another object of the present invention is to provide a device that is simple to manufacture, that uses common materials and techniques, and is thus low in cost to manufacture and purchase.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, and in accordance with the invention, a cooking device is provided. The cooking device has no more than a single cooking surface, and includes a plate with top and bottom surfaces. Preferably, the bottom surface of the plate is a heatable cooking surface and the device includes means for controlling the temperature of the heatable cooking surface. The cooking device also preferably includes a handle and a probe housing, both attached to the plate.

The device also includes a plurality of temperature probes of different lengths projecting from the bottom surface, wherein each temperature probe has an end, and the end is preferably the distal end. The temperature probes are configured for injecting into a piece of food such that the temperature of the food surrounding each probe end may be determined. The temperature probes are resiliently connected to the plate in order to allow each probe to retract into the plate of the cooking device when contacting a non-penetrable surface. The device also includes means for indicating the temperature of at least one probe's end which is preferably an audible indicator, a light indicator, a mercury scale, a digital liquid crystal display, a light emitting diode display, a Nixie tube display, or some combination thereof. The means for indicating the temperature of at least one probe's end may be configured to indicate the temperature of the coolest probe end.

In one aspect of the invention, the resilient connection comprises a compression spring having two ends, the spring being attached at one end to a probe and at the other end to the probe housing.

In another aspect of the invention, a probe of the cooking device includes a cap, and the resilient connection comprises an extension spring extending between the cap and the plate of the cooking device.

BRIEF DESCRIPTION OF THE DRAWINGS

The accompanying drawings incorporated in and forming a part of the specification illustrate several aspects of the present invention, and together with the description serve to explain the principles of the invention. In the drawings:

FIG. 1 is a front view of the cooking device, shown partially in cross section.

FIG. 2 is a graphical representation of the temperature T(s) along the thickness of the cooking food, as a function of distance s from the independent cooking surface to the bottom surface of the cooking device.

FIG. 5 is a diagrammatic view of an embodiment of the biasing means for the temperature probes.

FIG. 6 is a diagrammatic view of another embodiment of the biasing means for the temperature probes.

Reference will now be made in detail to the present preferred embodiment of the invention, an example of which is illustrated in the accompanying drawings.

DETAILED DESCRIPTION OF THE PREFERRED EMBODIMENT

Figure 3:
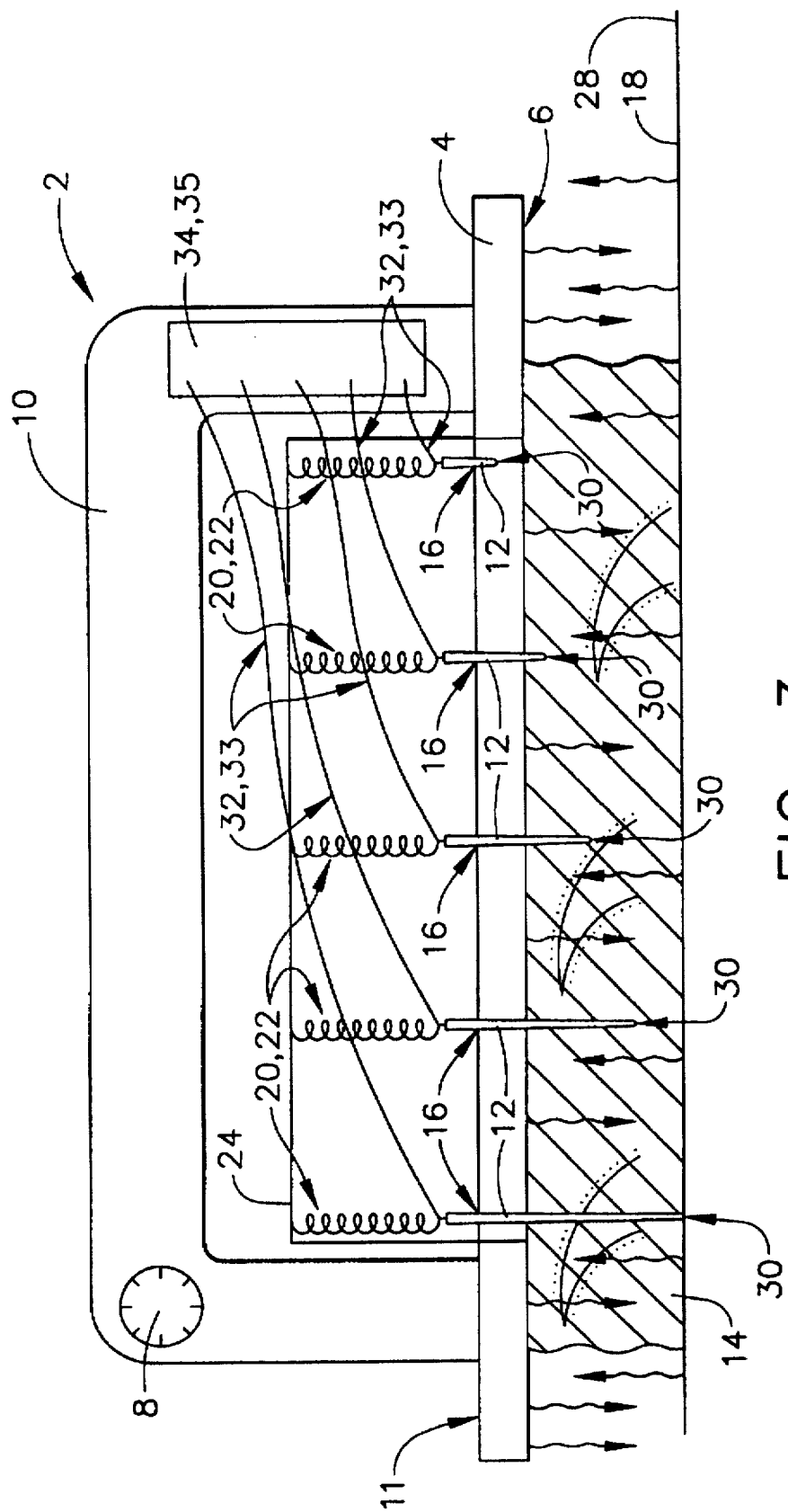
FIG. 3 is a front view of the cooking device, without any probe-connecting plates.

Referring now to the drawings in detail, wherein like numerals indicate the same elements throughout the views, FIG. 1 shows an embodiment of the cooking device 2 of the present invention, wherein a single hot plate 4 is provided, having a heatable bottom cooking surface 6. The bottom cooking surface 6 may be flat, but it also may have other configurations. For example, the bottom surface 6 may be ridged, rippled, have raised striped surfaces for a char-grilled appearance, or have any other any other configuration desired. The heatable cooking surface 6 is preferably made of a highly heat-conductive metal, and may take any shape, for example, rectangular, round, oval, etc. For heating the cooking surface 6, any conventional heating elements may be used, such as electrical resistance heating elements of the type used in electric stoves. Any feasible heating elements, such as those used in conventional clothes-irons and other household appliances, may be used. The heating elements are disposed within the hot plate 4, behind the cooking surface 6. The heating elements are preferably controlled by means for controlling the temperature of the heatable cooking surface 8, such as a rheostat. The controlling means 8 is provided with a temperature sensing device (not shown) which measures the temperature of the heatable cooking surface 6. The controlling means 8 and the temperature sensing device are of the type commonly used to regulate temperature in household appliances, the controlling means 8 measuring the temperature of the heatable cooking surface 6 and providing electrical energy to the heating element as is needed to regulate the temperature of the heatable cooking surface 6 to a determined value. The temperature controlling means 8 may be located on a handle 10, as shown in FIGS. 1 and 3, but may also be placed in any other convenient location. In an alternative embodiment (not shown), the bottom surface 6 is not heatable and no temperature controlling means 8 is provided.

The preferred embodiment includes a handle 10 attached to the top surface 11 of the hot plate 4 for allowing the user to comfortably grasp the device 2, so that the cooking device 2 may have a clothes-iron type of configuration, although other handle configurations are possible. The top surface 11 and handle 10 are preferably made from a non-heat conductive material, in order to prevent burning or discomfort to the user, without the need for cooking mitts or the like. A plurality of temperature probes 12 are provided, which preferably protrude different lengths from the heatable cooking surface 6 and are shaped like spikes or pins, for penetrating into the food 14 being cooked. The figures show an embodiment wherein there are five probes, spaced substantially evenly along a straight line. However, other spacing configurations are possible, as well. There may be more probes or fewer probes. They may be spaced evenly or unevenly along the bottom surface in a line or all over the bottom surface area. The probes may group in the middle of the surface or be spread throughout the surface area or protrude from the perimeter of the bottom surface area. An infinite number of spacing configurations are possible. Further, the probes 12 can be made of a stainless metal alloy and are preferably tapered with a round cross-sectional shape, though other materials and shapes may also be used.

The temperature probes 12 extend through apertures 16 provided in the hot plate 4. In order to prevent damage to the probes 12 due to forcing them against a non-penetrable surface 18, the probes 12 are resiliently connected to the hot plate 4 by biasing means 20, so that they can retract through the body of the hot plate 4 upon contacting such a non-penetrable surface. Each probe may be either individually resiliently connected to the hot plate by biasing means 20, or a plurality of probes may be connected by the same biasing means 20, to the hot plate 4 via a probe-connecting plate. The probes 12 may be connected to the hot plate 4 directly by biasing means 20 such as an extension spring 44, as shown in FIG. 6. Alternatively, the probes 12 may be connected to a housing 24 by a compression spring 22, wherein the housing is attached to the hot plate 4, as shown in FIG. 1. It should be understood that other resilient connections are also possible and are embraced by the present invention. The biasing means 20 must be firm enough so that the probes can penetrate through any pierceable food medium, without retracting into the body of the cooking device, but soft enough that the probes will retract when contacting a truly non-penetrable surface, such as a grill or a meat bone. In the case of a compression spring, for example, the firmness could be controlled by deciding the spring rate K, as a function of the loads P and deflection δ.

Individual probes 12 may be resiliently connected to the hot plate or probe housing 24, or alternatively, several probes 12 may connected to a probe-connecting plate 26 which, in turn, is resiliently connected to the hot plate 4 or probe housing. In the embodiment of FIG. 1, two pairs of the probes 12 are connected to probe-connecting plates 26, which are resiliently connected by biasing means 20 to a probe housing 24, and one of the probes 12 is individually connected to the probe housing 24. That configuration is shown by way of example and it should be understood that many other configurations are possible. In the embodiment shown in FIG. 1, the probes 12 are of different lengths and are substantially equally biased against the housing 24 using compression springs 22, so that the probes 12 connected by the probe-connecting plates 26 retract with substantially the same displacement when one such probe 12 contacts a non-penetrable surface 18, such as a meat bone or an independent cooking surface 28. The independent cooking surface 28 might be a flat grill, a barbecue grill, a pan, a baking tray, a broiler surface, a microwave tray, or any other non-penetrable independent cooking surface used for preparing foods. In alternative embodiments, all the probes 12 may be independently biased against a probe housing 24 using compression springs, as shown in FIG. 3, or the biasing means 20 can be configured with no probe housing 24, at all, as shown in FIG. 6 by the extension spring configuration 44.

In any case, the probes 12 are configured with biasing means 20, so that at least each probe 12 which contacts a non-penetrable surface 18 retracts into and through the hot plate 4, once the non-penetrable surface 18 is contacted.

The probes may be caused to penetrate the meat in several ways, depending upon the embodiment. FIG. 1 shows a configuration wherein the probes 12, which protrude from the bottom surface 6 when not in use, penetrate the meat by simply forcing the device onto the meat, thereby forcing the resiliently attached through the meat. In another embodiment of the invention (not shown), the probes can be caused to retract into the body of the device, when not in use, with a mechanism to advance the probes when the device is ready for use. Such a mechanism can be a lever, a switch such as those used in conventional switch blades, an electrically-wired button, or any other mechanical or electrical probe-advancing mechanism. Furthermore, in order to reduce the user's risk of being cut or poked by the probes, the probe-advancing mechanism can be configured so that the probes may be extended after the device is placed on the meat.

Each probe 12 is a thermometer, capable of determining the temperature at the distal end 30 of the probe. The output of each thermometer is fed into a decoder/driver 33, which is then fed to the input of an output means for indicating the temperature at the probes' ends 30, which provides the user with a audio or visual display 35 which preferably indicates the temperature of the coolest probe, and possibly indicates the temperature of other probes, as well. Wires or some other signal-carrying means 32 known in the art serve as the decoder/driver 33 and connect the probes 12 to means for indicating the temperature at the probes' ends 34. The primary purpose of the means for indicating the temperature at the probes' ends 34 is to allow the user to know when the temperature of the coolest part of the meat reaches the desired temperature, in order to ensure the preferred level of doneness. To that end, the means for indicating the temperature at the probes' ends 34 may indicate the temperature of only the coolest probe or of several probes. The means 34 may allow the user to choose which of the probes' temperatures are displayed. The means 34 may even display several of the probes' temperatures, as chosen by the user. It may utilize a light indicator or an audible indicator to indicate when a pre-determined temperature is reached, or use a numerical display such as a mercury scale or a digital display constructed with liquid crystal displays, light emitting diodes, Nixie tubes or a combination thereof. As can be appreciated, there are many display options available and any feasible method for displaying at least the temperature of the coolest temperature probe may be used. Furthermore, in the embodiment of the device having a heatable bottom surface, the device could have an automatic shut-off mechanism to terminate the heating upon reaching a pre-determined temperature of a probe 12. Probes 12 of these types, such as those manufactured by Atkins Technical Inc., the thermometer company based in Gainesville, Fla., are known in the art for other applications and contain the necessary decoder/driver 33 and means for indicating the temperature 34 elements, already built-in. The means for indicating the temperature 34 is preferably located on the handle 10, but may also be located in any other convenient location.

FIG. 2 is a graphical representation of the temperature T(s) along the thickness of the cooking food, from the independent cooking surface 28 to the bottom surface 6 of the cooking device 2 in FIG. 1, assuming that the temperatures of the bottom cooking surface 6 and the independent cooking surface 28 are equal. When the cooking device 2 is in use, the independent cooking surface 28 and the heatable bottom cooking surface 6 will supply heat to the food, heating both exterior sides of the food, simultaneously. Obviously, because the independent cooking surface 28 and the heatable bottom surface 6 are going to be the hottest, so will the exterior surfaces. The highest temperature will be at both ends of the thickness of the food 14. The coolest point along the thickness of the food 14 will be at approximately the middle, furthest away from the two heating surfaces. The graph of FIG. 2 illustrates that phenomenon. By calculating the temperature of the coolest part of the food, the user is able to determine whether it is done. In the case of beef steaks, for example, a central temperature between 165 and 180 degrees Fahrenheit indicates that the steak is done, and bacteria is eliminated.

Figure 4:
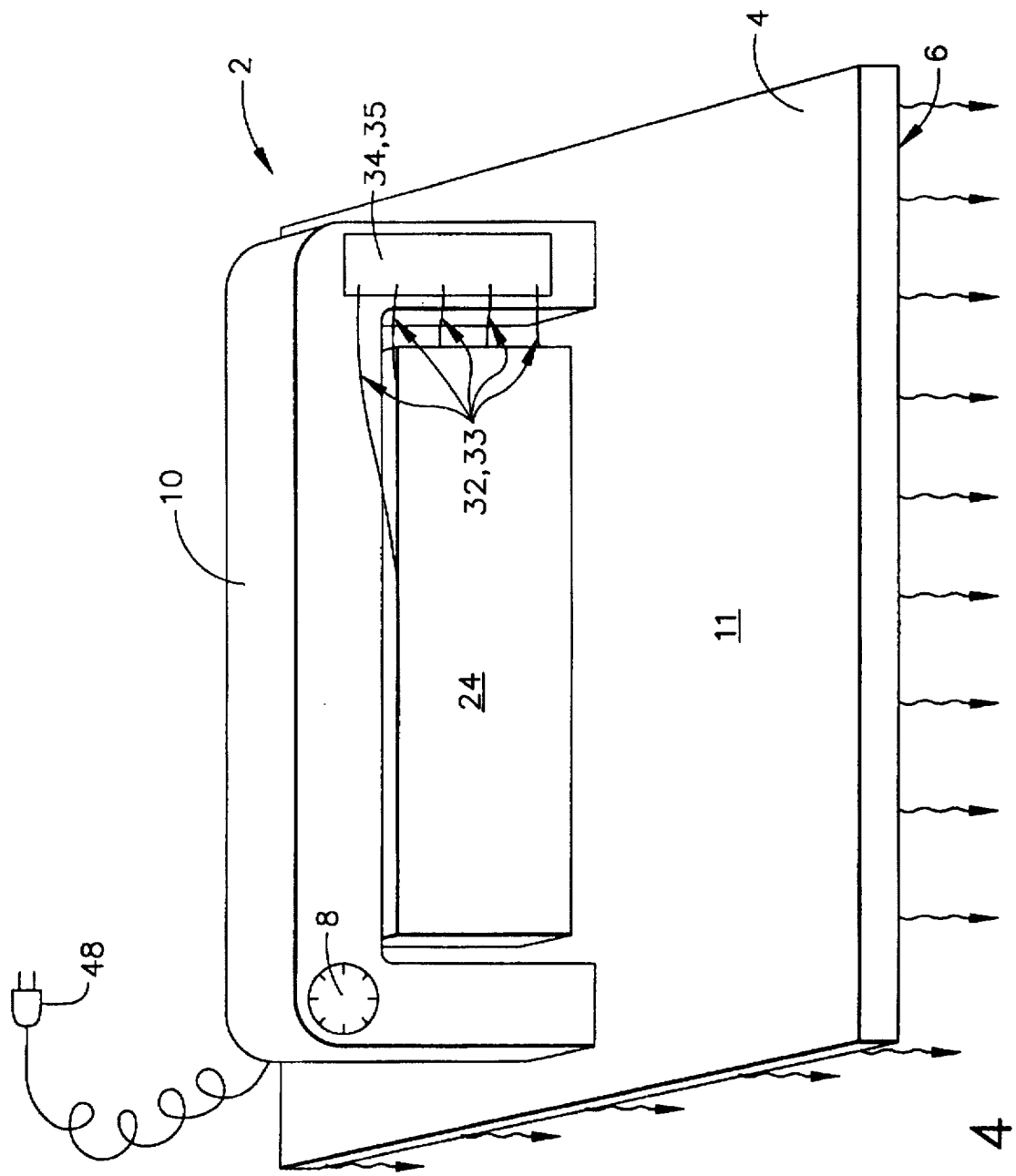
FIG. 4 is a perspective view of one embodiment of the cooking device of FIG. 1, wherein the probe configuration includes a probe housing.

In FIG. 4, the probe configuration includes a probe housing 24 with at least one opening for allowing signal-carrying means 32, depicted as wires attached to the probes 12, to extend to means for indicating the temperature at the probes' ends 30. The means for indicating the temperature at the probes' ends 34 is shown on the handle 10. The temperature indicating means 34 may be one unit or separate units for one or more of the temperature probes 12. In this embodiment, the energy for heating the bottom surface 6 of the hot plate 4 is provided by electricity from a conventional plug 48 and socket configuration, but may be cordless, using batteries, solar power, or any other means of energy.

FIG. 5 illustrates an embodiment of the biasing means 20 for the temperature probes 12, showing a helical compression spring 38, the narrower diameter 40 of which is positioned on the top of the probe, and the broader diameter 42 of which is attached to an inside surface of the probe housing 24. Alternatively, FIG. 6 shows an embodiment of the biasing means for the temperature probes 12, shown as an extension spring 44, seated between a cap 46 at the end 30 of the probe 12 and the top surface 11 of the hot plate 4. It should be understood that in any of the biasing means configurations, the firmness of the biasing means should be great enough to allow the probes 12 to penetrate most any food item, but small enough to deflect when contacting a truly non-penetrable surface, such as a meat bone or a grill. As described earlier, the probes 12 may penetrate the meat 14 either by forcing already protruding probes 12 into the meat 14, or by a mechanism designed to advance the probes 12 from the body of the device 2 and into the meat 14, once the device 2 is placed on the meat 14 being cooked.

There is a direct correlation between the temperature of foods and the degree of doneness of those foods. For example, with a beef steak, a central temperature between 165 and 180 degrees Fahrenheit indicates that the steak 14 is done. With the cooking device 2 of the present invention, it is simple to cook food 14 to the appropriate temperature with an inexpensive, compact and convenient tool, particularly suited to cooking steaks 14 and other meats to perfection. For the sake of example, operation of the preferred embodiment of the device 2 will be described for use in cooking steaks 14. First, the user needs to turn the device 2 on by plugging the plug 48 into a socket and/or turning on a switch (not shown). Second, the temperature of the bottom surface 6 of the hot plate 4 is adjusted using means 8 for controlling the temperature of the bottom cooking surface 6. The steak 14 is placed on the independent cooking surface 28. When the hot plate 4 has reached the desired temperature, the cooking device 2 is placed on the steak 14. The probes 12 are injected into the steak 14 like small daggers by force or by a lever, button, or any feasible mechanical or electrical probe advancing mechanism. If any of the probes 12 hit a non-penetrable surface 18, such as the independent cooking surface 28 or a bone, those probes 12 are retracted up into the hot plate 4, thereby actuating the biasing means 20. By design, the temperature of the distal ends 30 of each of the probes 12 is determined, ascertaining the temperature of the surrounding meat 14. The temperature information is transferred by signal-carrying means 32 to means for indicating the temperatures at the probes' ends 30. At least one probe's 12 temperature is displayed. Further, depending upon the embodiment, a fixed plurality or an elected plurality of the probes' 12 temperatures can be displayed, as well. The display 35 may be a numerical display, or may simply constitute a light which is illuminated or a noise which is sounded when a temperature probe reaches a certain maximum temperature, for example. Other display alternatives are also available and are embraced by the present invention. The coolest temperature will be at approximately the center of the steak 14, and based on that temperature, the user may determine the doneness of the steak 14 on a scale of rare to well done. The cooking device 2 may then be removed and the steak 14 may be served. Not only will the steak 14 be cooked to the desired level, but the user will know that all illness-causing bacteria has been eliminated.

In summary, numerous benefits have been described which result from employing the concepts of the invention. The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described in order to best illustrate the principles of the invention and its practical application to thereby enable one of ordinary skill in the art to best utilize the invention in various embodiments and with various modifications as are suited to the particular use contemplated. It is intended that the scope of the invention be defined by the claims appended hereto.

What is claimed is:

1. A cooking device having no more than a single cooking surface, the cooking device comprising:

a plate having a top surface and a bottom surface;

a plurality of temperature probes of different lengths projecting from said bottom surface, said temperature probes each having an end, said temperature probes configured for injecting into a piece of food such that the temperature of the food surrounding each probe end may be determined, and said temperature probes being resiliently connected to the plate in order to allow each probe to retract into the plate of the cooking device when contacting a non-penetrable surface; and means for indicating the temperature of at least one probe's end.

2. A cooking device according to claim 1, wherein said bottom surface of the plate is a heatable cooking surface.

3. A cooking device according to claim 2, further comprising means for controlling the temperature of the bottom cooking surface.

4. A cooking device according to claim 1, further comprising a handle attached to said plate.

5. A cooking device according to claim 1, wherein said means for indicating the temperature of at least one probe's end is configured to indicate the temperature of the coolest probe end.

6. A cooking device according to claim 1, wherein means for indicating the temperature of at least one probe's end comprises a display.

7. A cooking device according to claim 1, wherein said means for indicating the temperature of at least one probe's end is chosen from the group consisting of an audible indicator, a light indicator, a mercury scale, a digital liquid crystal display, a light emitting diode display, a Nixie tube display, and combinations thereof.

8. A cooking device according to claim 1, further comprising a probe housing attached to said plate.

9. A cooking device according to claim 8, wherein the resilient connection comprises a compression spring having two ends, the spring being attached at one end to a probe and at the other end to the probe housing.

10. A cooking device according to claim 1, wherein at least one said probe includes a cap, located opposite from the probe end.

11. A cooking device according to claim 10, wherein the spring-loading configuration comprises an extension spring extending between the cap and the plate.

12. A cooking device having no more than a single cooking surface, the cooking device comprising:

a plate having a top surface and a heatable bottom cooking surface;

a handle attached to said plate;

a probe housing attached to said plate;

a plurality of temperature probes of different lengths projecting from said bottom surface, said temperature probes each having an end, said temperature probes configured for injecting into a piece of food such that the temperature of the food surrounding each probe end may be determined, and said temperature probes being resiliently connected to the plate in order to allow each probe to retract into the plate of the cooking device when contacting a non-penetrable surface, wherein the resilient connection comprises a compression spring having two ends, the spring being attached at one end to a probe and at the other end to the probe housing;

means for controlling the temperature of the bottom cooking surface;

means for indicating the temperature of at least one probe's end, wherein said means for indicating the temperature of at least one probe's end is chosen from the group consisting of an audible indicator, a light indicator, a mercury scale, a digital liquid crystal display, a light emitting diode display, a Nixie tube display, and combinations thereof.

* * * * *